J. W. TIMMONS.
HOE.
APPLICATION FILED DEC. 20, 1913.
1,108,527.
Patented Aug. 25, 1914.
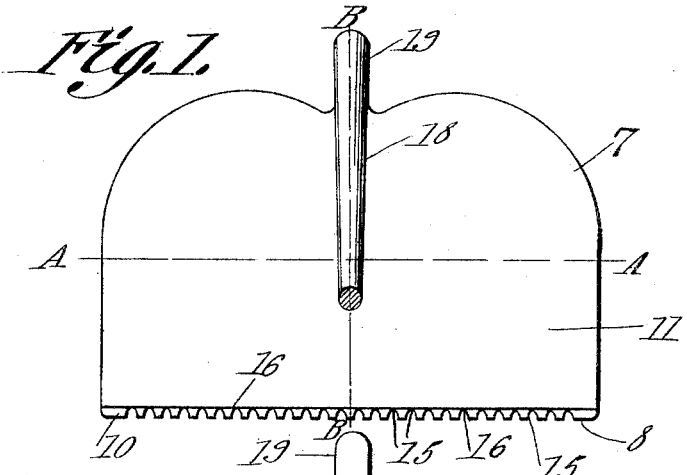
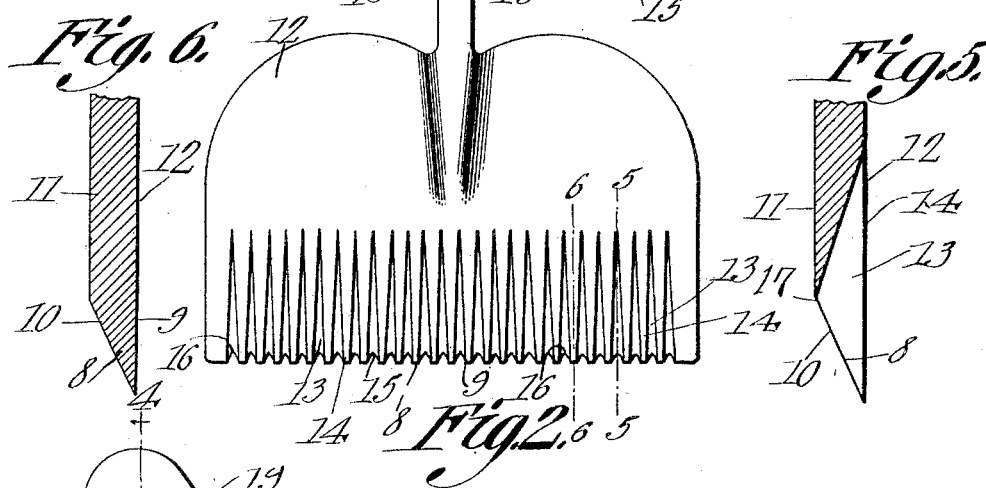
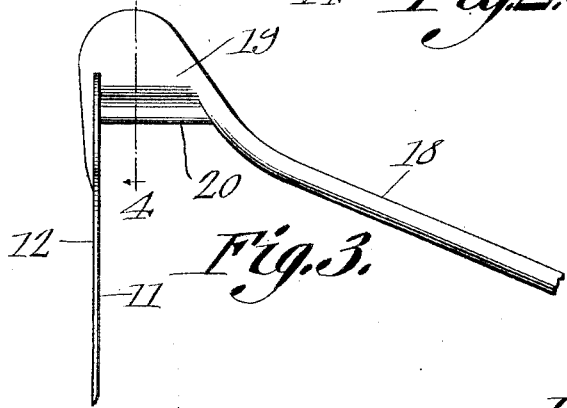
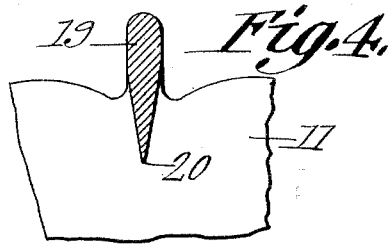
J. W. Timmons, Inventor

UNITED STATES PATENT OFFICE.

JOSEPH W. TIMMONS, OF ORLANDO, FLORIDA.

HOE.

1,108,527.  Specification of Letters Patent.  Patented Aug. 25, 1914.

Application filed December 20, 1913. Serial No. 807,994.

*To all whom it may concern:*

Be it known that I, JOSEPH W. TIMMONS, a citizen of the United States, residing at Orlando, in the county of Orange and State of Florida, have invented a new and useful Hoe, of which the following is a specification.

This invention relates to improvements in hoes.

An object of the present invention is to provide an improved form of blade which may be used as a hoe or other allied farm tool.

A further object is to provide a blade with transversely extending corrugations or ribs formed or cut along the under surface, enlarging and terminating at the cutting edge thereof and which blade may be used in the capacity of a hoe or allied farm implement.

A further object is to provide a hoe with a wedge-shaped cutting edge and which is provided at regular intervals therealong with a plurality of notches or U-shaped slots the apices of which terminate substantially central of the grooved portions of the corrugations, to thereby provide a blade with increased cutting capacity and which will not easily dull.

A further object is to provide a blade with a wedge-shaped shank carried thereby and which wedge-shaped shank defines a cutting edge for the material which passes over the blade and which would normally cling thereto.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 1 is a front view in elevation of a blade constructed along the lines of my invention. Fig. 2 is a rear view thereof. Fig. 3 is a view showing the same in side elevation. Fig. 4 is a sectional view taken on the line 4—4 of Fig. 3. Fig. 5 is a sectional view taken on the line 5—5 of Fig. 2. Fig. 6 is a similar view taken on the line 6—6 of Fig. 2.

Referring to the drawings in which similar reference numerals designate corresponding parts throughout the several views, A—A represents the longitudinal axis of the blade 7 and the line B—B represents the transverse axis or median line thereof. The longitudinal and transverse axes are defined by the direction of cut of the blade rather than by any difference of dimension in the contour of the blade.

The lower and cutting edge 8 of the blade is as disclosed in Figs. 5 and 6, wedge-shaped, the walls being beveled as at 10 to form a sharp cutting edge which will readily cut loose soil, twigs, weeds, or other material and will also be efficient in digging or breaking the ground. The front surface 11 of the blade is smooth and formed as a plane with the exception of the cutting edge 8. The rear surface 12 however is provided with the transversely extending grooves 13 and which define the ribs 14 therebetween. The grooves as will be apparent from a reference to Fig. 2 of the drawings, are narrow toward their upper extremity and also approach the surface 12 as illustrated in Fig. 5. The ribs on the other hand widen at their upper extremities and merge gradually into the surface 12. It is to be noted however in this connection that the ribs and intermediate grooves may be made of equal and uniform width if it be so desired and the circumstances so warrant.

The cutting edge 8 is not continuous but is provided with a plurality of notches 15 substantially U-shaped in cross section so that a serrated cutting edge will be had. The apex 17 of each notch terminates in and approximately central of the grooves 13 so that the cutting edges of the notches are adjacent the front surface 11 as at 17. The cutting edge of the groove approaching the edge 8 has the groove merged into an adjacent rib. The blade when so constructed will uniformly tend to sharpen itself during the normal use of the article. Also a decidedly efficient action is obtained when the blade is utilized to cut roots, weeds, or to break and pulverize the soil.

A shank 18 is carried by the blade 7 and is affixed thereto through the intervention of the head 19. The head 19 is V-shaped in cross section as illustrated in Fig. 4 and terminates to a cutting edge 20. The cutting edge 20 extends substantially perpendicular to the plane of the surface 11 and is positioned some little distance from the upper extremity thereof. The head 19 in addition to materially strengthening the connection between the shank 18 and blade 7, by its beveled cutting edge 20, provides that weeds which pass over the blade and contact with the shank, instead of intertwining or becoming wrapped therearound, will pass either to one side thereof or will be cut thereby. The same remark holds true when the blade is used in the capacity of a hoe to break the soil. The soil passing over the front surface 11 will contact with the shank and be severed or broken thereby. Thus should a root be encountered during the use of the hoe and which root extends parallel to the surface of the blade, i. e. substantially horizontal, it will contact with the shank and be immediately severed thereby. Thus it will not in any way interfere with the proper and efficient action of the hoe. In this manner the hoe will cut a great number of fine or small twigs or roots without the operator being aware of their presence or disturbed thereby.

Having thus fully described my invention, what I claim is:—

1. A blade comprising parallel, plane front and rear surfaces, the lower edge of the blade being beveled toward and forming a cutting edge at the rear surface, said blade provided with a plurality of spaced grooves in the rear surface with the bottom wall thereof beveled toward the front surface and forming a cutting edge at the said front surface.

2. A blade comprising parallel, plane front and rear surfaces, the lower edge of the blade being beveled toward and forming a serrated cutting edge at the rear surface, said blade provided with a plurality of spaced grooves in the rear surface with the bottom wall thereof beveled toward the front surface and forming a serrated cutting edge at the said front surface.

3. A blade comprising parallel plane front and rear surfaces, the lower edge of said blade beveled toward and forming a cutting edge at the rear surface, said blade provided with a plurality of beveled grooves spaced a distance apart, with the beveling extending toward the front surface and providing a cutting edge at the said front surface, the said grooves thus providing superimposed serrated cutting edges at the front and rear surfaces.

4. A blade comprising parallel plane front and rear surfaces, the lower edge of said blade beveled toward and forming a cutting edge at the rear surface, said blade provided with a plurality of beveled grooves spaced a distance apart, with the beveling extending toward the front surface and providing a cutting edge at the said front surface, the said grooves thus providing superimposed serrated cutting edges at the front and rear surfaces, said grooves of gradually diminishing width.

In testimony that I claim the foregoing as my own, I have hereto affixed my signature in the presence of two witnesses.

JOSEPH W. TIMMONS.

Witnesses:
J. W. CONNER,
F. S. LUCIUS.